United States Patent
Pei et al.

(10) Patent No.: US 10,921,431 B2
(45) Date of Patent: Feb. 16, 2021

(54) APPARATUSES FOR SCANNING A LIDAR SYSTEM IN TWO DIMENSIONS

(71) Applicant: Cepton Technologies, Inc., San Jose, CA (US)

(72) Inventors: Jun Pei, Saratoga, CA (US); Mark A. McCord, Los Gatos, CA (US); Roger David Cullumber, Hollister, CA (US); Yupeng Cui, San Jose, CA (US); Dongyi Liao, Mountain View, CA (US)

(73) Assignee: Cepton Technologies Inc., San Jose, CA (US)

( * ) Notice: Subject to any disclaimer, the term of this patent is extended or adjusted under 35 U.S.C. 154(b) by 311 days.

(21) Appl. No.: 15/971,548

(22) Filed: May 4, 2018

(65) Prior Publication Data

US 2019/0120940 A1 Apr. 25, 2019

Related U.S. Application Data

(60) Provisional application No. 62/574,549, filed on Oct. 19, 2017.

(51) Int. Cl.
*G01S 17/48* (2006.01)
*G01S 7/481* (2006.01)
(Continued)

(52) U.S. Cl.
CPC .......... *G01S 7/4817* (2013.01); *G01S 7/4815* (2013.01); *G01S 17/42* (2013.01); *G01S 17/89* (2013.01)

(58) Field of Classification Search
None
See application file for complete search history.

(56) References Cited

U.S. PATENT DOCUMENTS 4,302,709 A * 11/1981 Tichtinsky ........... G02B 7/1821
310/321
5,254,844 A 10/1993 Krichever et al.
(Continued)

FOREIGN PATENT DOCUMENTS

CN 101408672 A 4/2009
CN 102027404 A 4/2011
(Continued)

OTHER PUBLICATIONS

Yong, Design and Control of a Novel Non-Raster Scan Pattern for Fast Scanning Probe Microscopy, The 2012 IEEE/ASME International Conference on Advanced Intelligent Mechatronics Jul. 11-14, 2012, p. 456-461 (Year: 2012).*
(Continued)

*Primary Examiner* — Hovhannes Baghdasaryan
(74) *Attorney, Agent, or Firm* — Kilpatrick Townsend & Stockton LLP

(57) ABSTRACT

A scanning lidar system includes a fixed frame, a first platform, and a first electro-optic assembly. The first electro-optic assembly includes a first laser source and a first photodetector mounted on the first platform. The scanning lidar system further includes a first flexure assembly flexibly coupling the first platform to the fixed frame, and a drive mechanism configured to scan the first platform with respect to the fixed frame in two dimensions in a plane substantially perpendicular to an optical axis of the lidar system. The scanning lidar system further includes a controller coupled to the drive mechanism. The controller is configured to cause the drive mechanism to scan the first platform in a first direction with a first frequency and in a second direction with a second frequency. The second frequency is similar but not identical to the first frequency.

18 Claims, 12 Drawing Sheets

(51) Int. Cl.
*G01S 17/42* (2006.01)
*G01S 17/89* (2020.01)

(56) References Cited

U.S. PATENT DOCUMENTS

| | | | |
|---|---|---|---|
| 5,529,277 A * | 6/1996 | Ostaszewski | F16C 11/12 |
| | | | 248/398 |
| 5,827,266 A | 10/1998 | Harel et al. | |
| 2006/0192858 A1* | 8/2006 | Calvet | H04N 5/23287 |
| | | | 348/208.7 |
| 2007/0103699 A1 | 5/2007 | Kohnen et al. | |
| 2007/0181810 A1 | 8/2007 | Tan et al. | |
| 2011/0205523 A1 | 8/2011 | Rezk et al. | |
| 2013/0300999 A1* | 11/2013 | DeJong | G02B 27/017 |
| | | | 351/158 |
| 2014/0153001 A1 | 6/2014 | Chayat et al. | |
| 2019/0121123 A1* | 4/2019 | Kaupmann | F16M 11/125 |

FOREIGN PATENT DOCUMENTS

| | | |
|---|---|---|
| CN | 102393516 A | 3/2012 |
| CN | 106226899 A | 12/2016 |
| EP | 0 425 844 A2 | 5/1991 |
| JP | H11-168064 A | 6/1999 |
| JP | 2000-338430 A | 12/2000 |
| JP | 2007-155541 A | 6/2007 |
| JP | 4807695 B2 | 11/2011 |
| KR | 10-1996-0015058 A | 5/1996 |
| KR | 10-2007-0012651 A | 1/2007 |
| KR | 10-2007-0086874 A | 8/2007 |
| KR | 10-2008-0088501 A | 10/2008 |
| KR | 10-2010-0053465 A | 5/2010 |
| KR | 10-2010-0106517 A | 10/2010 |
| KR | 10-2016-0070128 A | 6/2016 |
| WO | 2017189185 A1 | 11/2017 |

OTHER PUBLICATIONS

PCT/US2018/055363, "International Preliminary Report on Patentability", dated Apr. 30, 2020, 8 pages.
Bazaei, et al., "Review of Scientific Instruments", School of Electrical Engineering and Computer Science, The University of Newcastle, Callaghan, NSW 2308, Australia, 83, 063701, Jun. 4, 2012, 10 pages.
PCT/US2018/055363, "International Search Report and Written Opinion", dated Jan. 29, 2019, 11 pages.
PCT/US2018/055363, "Invitation to Pay Additional Fees and, Where Applicable, Protest Fee", dated Nov. 19, 2018, 2 pages.
Japanese Office Action dated Sep. 4, 2020 in related Japanese Patent Application No. 2020-522035, filed Oct. 11, 2018 (three pages).
Notice of Allowance dated Oct. 15, 2020 of related Korean Patent Application No. 10-2020-7014225, filed Oct. 11, 2018 (five pages).
Supplementary European Search Report dated Oct. 23, 2020 in related European Patent Application No. 18868039.1, filed Oct. 11, 2018 (seven pages).
First Office Action dated Nov. 3, 2020 in related Chinese Patent Application No. 201880078289.5, filed Oct. 11, 2018 (twelve pages).

* cited by examiner

APPARATUSES FOR SCANNING A LIDAR SYSTEM IN TWO DIMENSIONS

CROSS-REFERENCES TO RELATED APPLICATIONS

This application claims the benefit of U.S. Provisional Patent Application No. 62/574,549, filed on Oct. 19, 2017, entitled "Methods For Scanning And Operating Three-Dimensional Systems," the contents of which is incorporated by reference in its entirety.

BACKGROUND OF THE INVENTION

Three-dimensional sensors can be applied in autonomous vehicles, drones, robotics, security applications, and the like. Scanning LIDAR sensors may achieve high angular resolutions appropriate for such applications at an affordable cost. However, improved scanning apparatuses and methods are needed.

SUMMARY OF THE INVENTION

According to some embodiments of the present invention, a scanning lidar system may include a fixed frame, a first platform, and a first electro-optic assembly. The first electro-optic assembly may include a first laser source and a first photodetector mounted on the first platform. The scanning lidar system may further include a first flexure assembly flexibly coupling the first platform to the fixed frame, and a drive mechanism configured to scan the first platform with respect to the fixed frame in two dimensions in a plane substantially perpendicular to an optical axis of the lidar system. The scanning lidar system may further include a controller coupled to the drive mechanism. The controller may be configured to cause the drive mechanism to scan the first platform in a first direction with a first frequency and in a second direction with a second frequency. The second frequency is similar but not identical to the first frequency. In some embodiments, a ratio of the first frequency and the second frequency is rational. In some other embodiments, a ratio of the first frequency and the second frequency is irrational.

According to some other embodiments of the present invention, a resonator structure for operating a two-dimensional scanning lidar system may include a fixed frame, and a first platform for carrying a first electro-optic assembly of the scanning lidar system. The first electro-optic assembly may include a first laser source and a first photodetector. The resonator structure may further include a first set of springs flexibly coupling the first platform to the fixed frame. The first set of springs may be configured to be flexed in two orthogonal directions so as to scan the first platform in the two orthogonal directions in a plane substantially perpendicular to an optical axis of the scanning lidar system. The first set of springs may have a first resonance frequency in a first direction of the two orthogonal directions and a second resonance frequency in a second direction of the two orthogonal directions. The second resonance frequency is similar to but different from the first resonance frequency. In some embodiments, the first set of springs includes four rod springs, each of the four rod springs connecting a respective corner of the first platform to the fixed frame. In some embodiments, each of the four rod springs may be connected to the first platform via a flexible member. The flexible member may be stiffer in the second direction than in the first direction. In some other embodiments, each of the first set of springs may include a leaf spring. The leaf spring may be convoluted. In some embodiments, the resonator structure may further include a second platform, and a second set of springs flexibly coupling the second platform to the fixed frame. The second set of springs may be configured to be flexed in the two orthogonal directions so as to scan the second platform in the two orthogonal directions. A direction of motion of the second platform may oppose a direction of motion of the first platform. In some embodiments, the second platform may carry a second electro-optic assembly of the scanning lidar system. The second electro-optic assembly may include a second laser source and a second photodetector.

According to some further embodiments of the present invention, a method of three-dimensional imaging using a scanning lidar system may include scanning an electro-optic assembly of the lidar system in two dimensions in a plane substantially perpendicular to an optical axis of the lidar system. The electro-optic assembly may include a first laser and a first photodetector. The scanning the electro-optic assembly may include scanning the electro-optic assembly in a first direction with a first frequency, and scanning the electro-optic assembly in a second direction substantially orthogonal to the first direction with a second frequency. The second frequency is similar but not identical to the first frequency. The method may further include emitting, using the first laser source, a plurality of laser pulses at a plurality of positions as the electro-optic assembly is scanned in two dimensions, detecting, using the first photodetector, a portion of each respective laser pulse of the plurality of laser pulses reflected off of one or more objects, determining, using a processor, a time of flight between emitting each respective laser pulse and detecting the portion of the respective laser pulse, and constructing a three-dimensional image of the one or more objects based on the determined times of flight.

DETAILED DESCRIPTION OF THE SPECIFIC EMBODIMENTS

The present invention relates generally to lidar systems for three-dimensional imaging. More specifically, the present invention relates to methods and apparatuses for scanning a lidar system in two dimensions. Merely by way of example, embodiments of the present invention provide scanning apparatuses and methods where the scanning in both the horizontal and vertical directions are fast, and the scanning frequencies in the two directions are similar but not identical.

Figure 1:
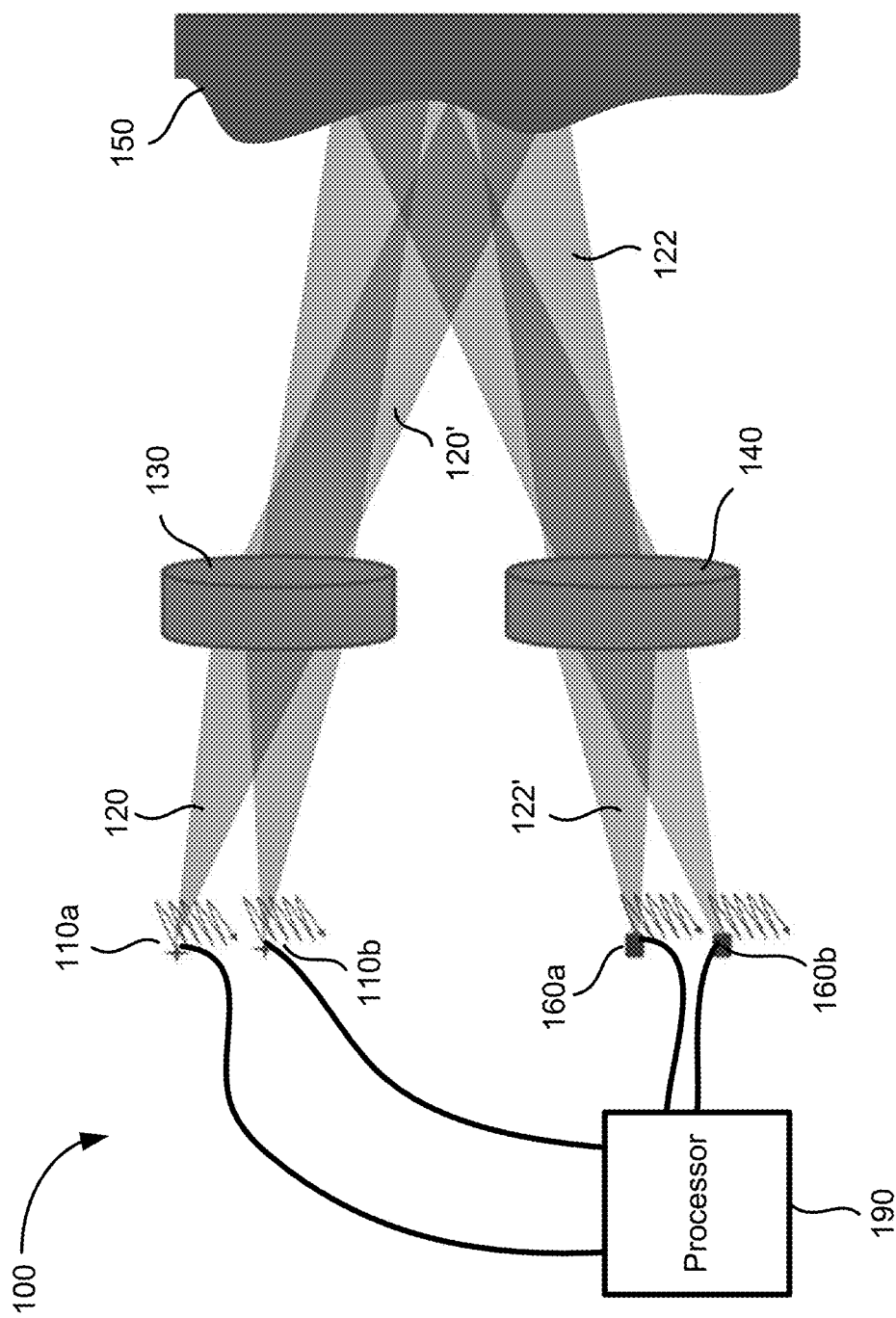
FIG. 1 illustrates schematically a lidar sensor for three-dimensional imaging according to some embodiments of the present invention.

FIG. 1 illustrates schematically a lidar sensor 100 for three-dimensional imaging according to some embodiments of the present invention. The lidar sensor 100 includes an emitting lens 130 and a receiving lens 140, both being fixed. The lidar sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the lidar sensor 100. For a given emission location of the laser source 110a, the collimated laser pulse 120' is directed at a corresponding angle toward the object 150.

A portion 122 of the laser pulse 120 is reflected off of the object 150 toward the receiving lens 140. The receiving lens 140 is configured to focus the portion 122 of the laser pulse 120 reflected off of the object 150 onto a corresponding detection location in the focal plane of the receiving lens 140. The lidar sensor 100 further includes a photodetector 160a disposed substantially at the focal plane of the receiving lens 140. The photodetector 160a is configured to receive and detect the portion 122 of the laser pulse 120 reflected off of the object at the corresponding detection location. The corresponding detection location of the photodetector 160a is conjugate with the respective emission location of the laser source 110a.

The laser pulse 120 may be of a short duration, for example, 100 ns pulse width. The lidar sensor 100 further includes a processor 190 coupled to the laser source 110a and the photodetector 160a. The processor 190 is configured to determine a time of flight (TOF) of the laser pulse 120 from emission to detection. Since the laser pulse 120 travels at the speed of light, a distance between the lidar sensor 100 and the object 150 may be determined based on the determined time of flight.

According to some embodiments, the laser source 110a may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 110a is raster scanned within a certain area in the back focal plane of the emitting lens 130, a corresponding object area on the object 150 is scanned. The photodetector 160a is raster scanned to a plurality of corresponding detection locations in the focal plane of the receiving lens 140. The scanning of the photodetector 160a is performed synchronously with the scanning of the laser source 110a, so that the photodetector 160a and the laser source 110a are always conjugate with each other at any given time.

By determining the time of flight for each laser pulse emitted at a respective emission location, the distance from the lidar sensor 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the lidar sensor 100. Thus, a three-dimensional image of the object 150 may be constructed based on the measured distances from the lidar sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the lidar sensor 100 may be estimated based on the scanning range of the laser source 110a and the focal length of the emitting lens 130 as, $$AFOV = 2\tan^{-1}\left(\frac{h}{2f}\right),$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs. In some embodiments, the lidar sensor 100 may include multiple laser sources disposed as an array at the back focal plane of the emitting lens 130, so that a larger total AFOV may be achieved while keeping the scan range of each individual laser source relatively small. Accordingly, the lidar sensor 100 may include multiple photodetectors disposed as an array at the focal plane of the receiving lens 140, each photodetector being conjugate with a respective laser source. For example, the lidar sensor 100 may include a second laser source 110b and a second photodetector 160b, as illustrated in FIG. 1. In other embodiments, the lidar sensor 100 may include four laser sources and four photodetectors, or eight laser sources and eight photodetectors. In one embodiment, the lidar sensor 100 may include 8 laser sources arranged as a 4×2 array and 8 photodetectors arranged as a 4×2 array, so that the lidar sensor 100 may have a wider AFOV in the horizontal direction than its AFOV in the vertical direction. According to various embodiments, the total AFOV of the lidar sensor 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110*a* may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The photodetector 160*a* may comprise a silicon avalanche photodiode, a photomultiplier, a PIN diode, or other semiconductor sensors.

The angular resolution of the lidar sensor 100 can be effectively diffraction limited, which may be estimated as, $$\theta = 1.22 \lambda/D,$$

where $\lambda$ is the wavelength of the laser pulse, and D is the diameter of the lens aperture. The angular resolution may also depend on the size of the emission area of the laser source 110*a* and aberrations of the lenses 130 and 140. According to various embodiments, the angular resolution of the lidar sensor 100 may range from about 1 mrad to about 20 mrad (about 0.05-1.0 degrees), depending on the type of lenses.

As described above, a laser source and a photodetector in a lidar system may be raster scanned in two dimensions in a plane substantially perpendicular to an optical axis of the lidar system, in order to form three-dimensional images of objects within a certain field of view. Traditionally, two-dimensional scanning may be achieved by using a combination of a relatively fast scan in one direction (e.g., a line scan) and a much slower scan in the orthogonal direction (e.g., a sweep or frame scan). For the convenience of description, the fast scan may be referred herein as a horizontal scan, and the slow scan may be referred herein as a vertical scan. Such scanning methods may have certain disadvantages when applied in autonomous vehicles. For example, the scanning frequency in the slow direction may correspond to the frequency of encountering road bumps, which may affect the positional accuracy of the three-dimensional imaging by the lidar system.

Embodiments of the present invention provide scanning apparatuses and methods where the scanning in both the horizontal and vertical directions are fast, and the scanning frequencies in the two directions are similar but not identical. The resulting trajectory of the laser source or the photodetector may be characterized by a Lissajous pattern (also known as Lissajous curve or Lissajous figure). Mathematically, a Lissajous curve is a graph of parametric equations:

$$x = A \sin(at + \delta), \quad y = B \sin(bt),$$

where a and b are the frequencies in the x direction (e.g., the horizontal direction) and y direction (e.g., the vertical direction), respectively; t is time; and $\delta$ is a phase difference.

Figure 2A:
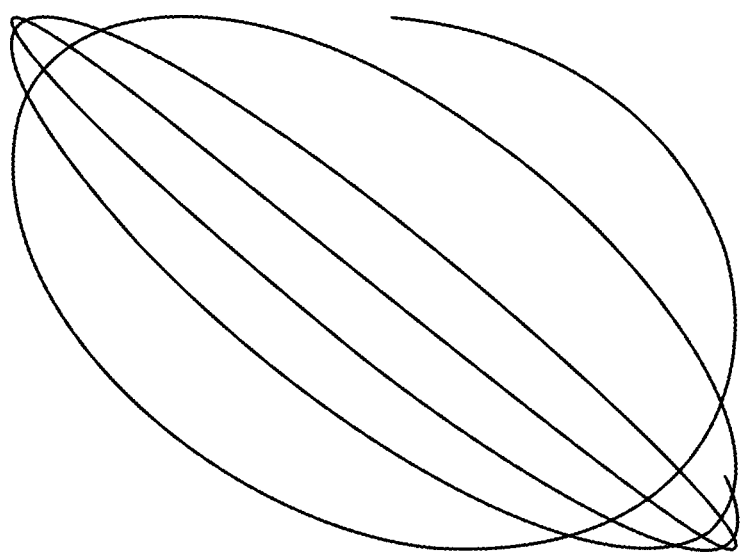
FIGS. 2A and 2B show a partially complete Lissajous pattern and a completed Lissajous pattern, respectively.
Figure 2B:
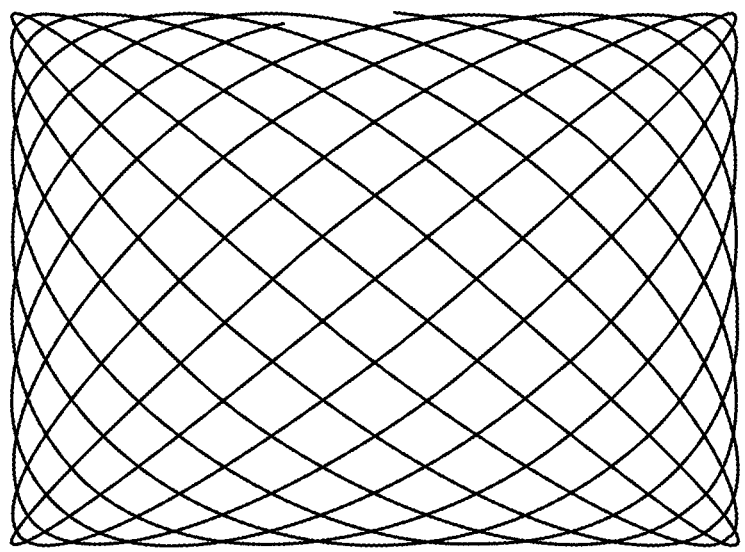

FIG. 2A shows a partially complete Lissajous pattern. FIG. 2B shows a completed Lissajous pattern. The appearance of the pattern may be sensitive to the ratio a/b and the phase difference $\delta$. By choosing the frequencies a and b in the two orthogonal directions to be similar but distinctly different from each other, the Lissajous pattern may exhibit many "lobes" in both directions. The Lissajous pattern may be closed only if the ratio a/b is rational. It may be advantageous to choose both the ratio a/b and the phase difference $\delta$ such that the trajectory of the laser source or the photodetector may cover a field of view uniformly.

The frame rate may be related to the difference between the two frequencies a and b. In some embodiments, the scanning frequencies a and b may be chosen based on a desired frame rate. For instance, if a frame rate of 10 frames per second is desired, a frequency of 200 Hz in the horizontal direction and 210 Hz in the vertical direction may be chosen. In this example, the Lissajous pattern may repeat exactly from frame to frame. By choosing the two frequencies a and b to be significantly greater than the frame rate and properly selecting the phase difference $\delta$, a relatively uniform and dense coverage of the field of view may be achieved.

In some other embodiments, if it is desired for the Lissajous pattern not to repeat, a different frequency ratio or an irrational frequency ratio may be chosen. For example, the scanning frequencies in the two directions a and b may be chosen to be 200 Hz and 210.1 Hz, respectively. In this example, if the frame rate is 10 frames per second, the Lissajous pattern may not repeat from frame to frame. As another example, the scanning frequencies a and b may be chosen to be 201 Hz and 211 Hz, respectively, so that the ratio a/b is irrational. In this example, the Lissajous pattern will also shift from frame to frame. In some cases, it may be desirable to have the Lissajous pattern not to repeat from frame to frame, as a trajectory of the laser source or the photodetector from a subsequent frame may fill in gaps of a trajectory from an earlier frame, thereby effectively have a denser coverage of the field of view.

In some embodiments, a frequency separation that is multiples of a desired frame rate may also be used. For example, the scanning frequencies in the two directions a and b may be chosen to be 200 Hz and 220 Hz, respectively. In this case, for example, a frame of either 10 Hz or 20 Hz may be used.

Figure 3A:
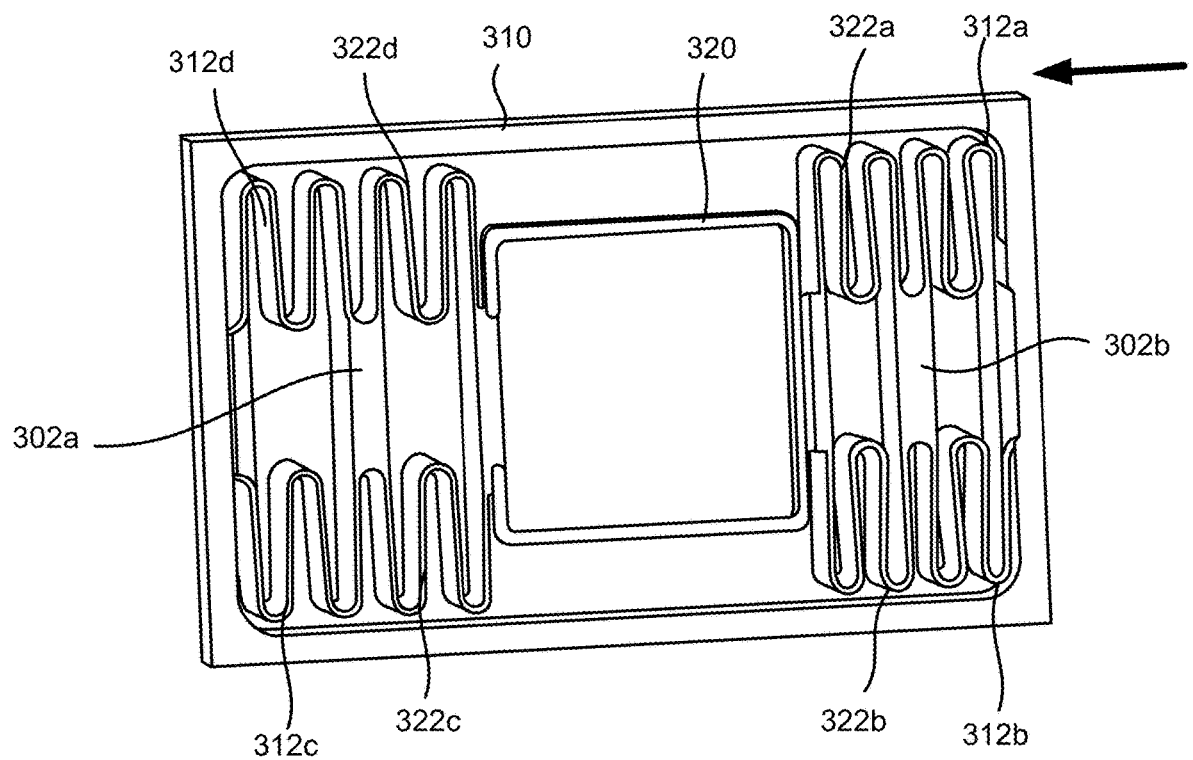
FIGS. 3A and 3B illustrate schematically a flexure mechanism for scanning a lidar system according to some embodiments of the present invention.
Figure 3B:
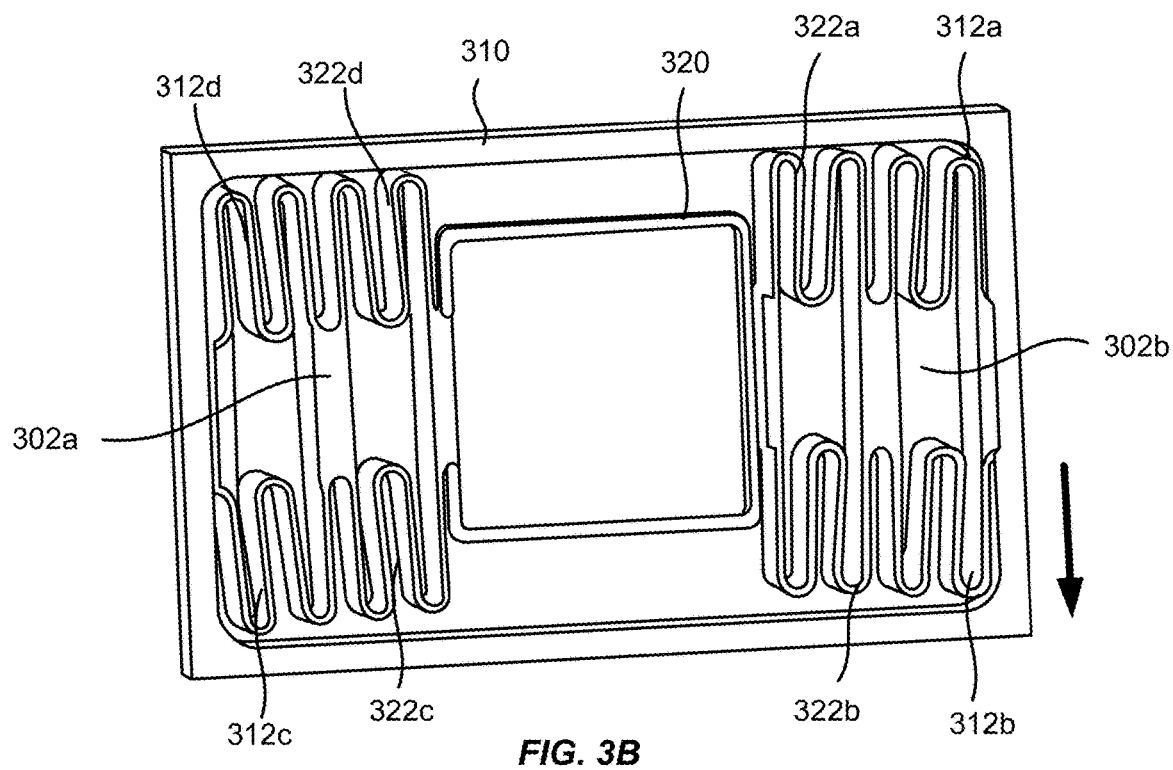

Two-dimensional scanning of a lidar system as described above may be implemented using flexures that can be flexed in two orthogonal directions. FIGS. 3A and 3B illustrate schematically a flexure mechanism for scanning a lidar system according to some embodiments of the present invention. An outer frame 310 may be attached to two fixed mounting points 302*a* and 302*b* via a first set of four leaf springs 312*a*-312*d*. The mounting points 302*a* and 302*b* may be attached to a fixed frame and are fixed in space. The outer frame 310 may carry an electro-optic assembly of the lidar system, which may include one or more laser sources and one or more photodetectors, as described above in relation to FIG. 1.

Each of the first set of leaf springs 312*a*-312*d* may be flexed left or right and up or down, so as to translate the outer frame 310 (and therefore the electro-optic assembly carried by the outer frame 310) horizontally and vertically with respect to the fixed mounting points 302*a* and 302*b*. For example, FIG. 3A shows that the outer frame 310 is translated to the left relative to the fixed mounting points 302*a* and 302*b* (as indicated by the arrow), while FIG. 3B shows that the outer frame 310 is translated downward relative to the fixed mounting points 302*a* and 302*b* (as indicated by the arrow). In some embodiments, each of the first set of four leaf springs 312*a*-312*d* may be convoluted, as illustrated in FIGS. 3A and 3B for a compact configuration.

In some embodiments, an inner frame 320 may be attached to the two fixed mounting points 302a and 302b via a second set of four leaf springs 322a-322d, as illustrated in FIGS. 3A and 3B. Similar to the first set of four leaf springs 312a-312d, each of the second set of leaf springs 322a-322d may be flexed left or right and up or down, so as to translate the inner frame 320 horizontally and vertically with respect to the fixed mounting points 302a and 302b.

In practice, to raster scan the electro-optic assembly of the lidar system horizontally and vertically, the outer frame 310 and the inner frame 320 may be vibrated at or near their resonance frequencies. By properly selecting the shape of the leaf springs 312a-312d and 322a-322d, slightly different resonance frequencies may be achieved in the horizontal and vertical directions. The outer frame 310 and the inner frame 320 may move in opposite directions, i.e., 180 degrees out of phase, similar to what the two prongs of a tuning fork would do. If the weight of the outer frame 310 and the weight of the inner frame 320 are properly balanced, their opposing motions may cancel vibrations that would otherwise be transmitted to the external mounts. In addition to minimizing vibration, this may also increase the resonant quality factor Q of the system, thus reducing power requirements.

In some embodiments, the inner frame 320 may carry a counterweight. Alternatively, the inner frame 320 may carry the electro-optic assembly of the lidar system, and the outer frame 310 may carry a counterweight. In some other embodiments, the inner frame 320 may carry a second electro-optic assembly of the lidar system that includes one or more laser sources and one or more photodetectors. In some further embodiments, the inner frame 320 may carry magnets or coils of a voice coil motor (VCM) that provides the mechanical drive for flexing the springs 312a-312d and 322a-322d.

Figure 4A:
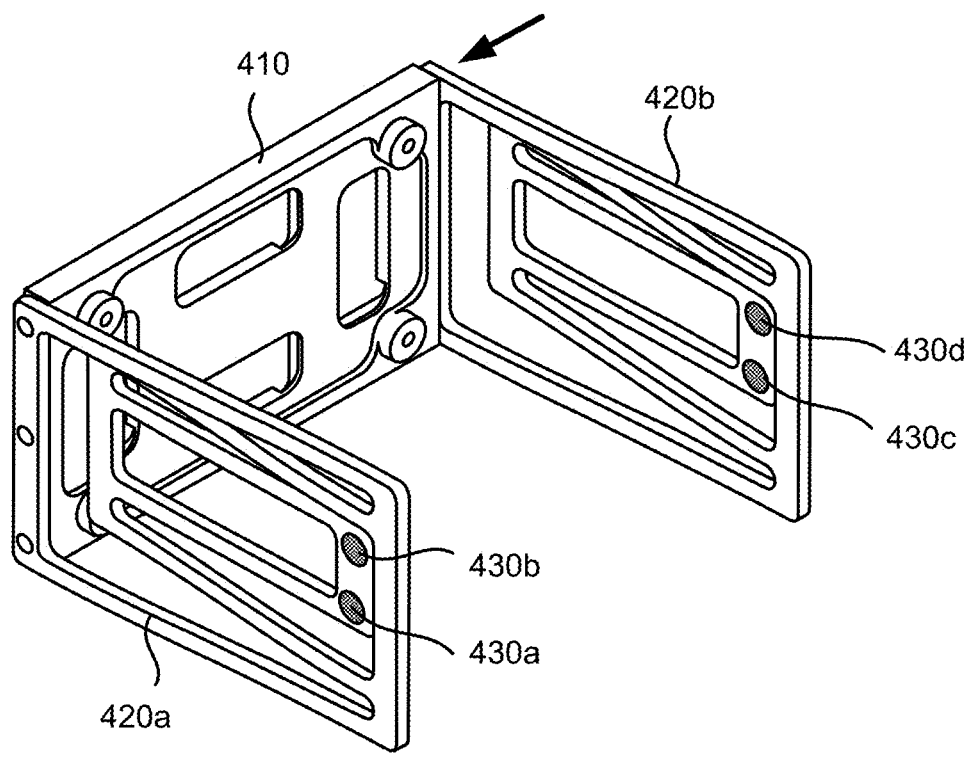
FIGS. 4A and 4B illustrate schematically a flexure mechanism for scanning a lidar system according to some other embodiments of the present invention.
Figure 4B:
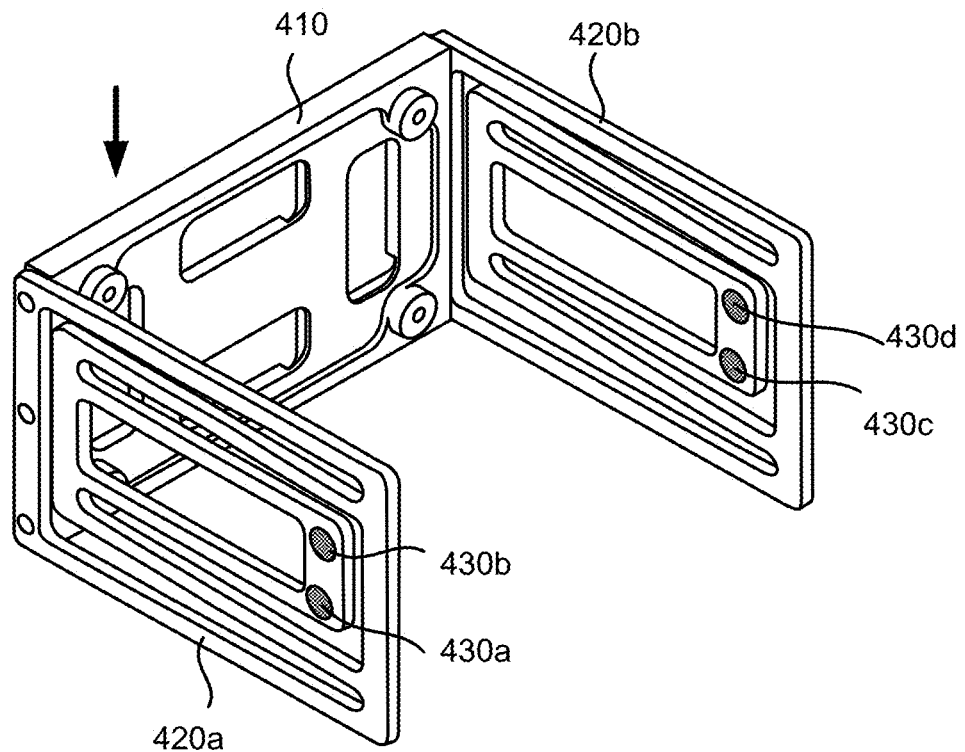

FIGS. 4A and 4B illustrate schematically a resonator structure for scanning a lidar system according to some other embodiments of the present invention. A frame 410 may be attached to a pair of flexures 420a and 420b on either side thereof. The frame 410 may carry an electro-optic assembly of the lidar system. For clarity, a counter-balance frame and a set of associated flexures are not shown in FIGS. 4A and 4B.

Each of the pair of flexures 420a and 420b may be fabricated by cutting a plate of spring material. A convolution configuration, as illustrated in FIGS. 4A and 4B, may be used to increase the effective length of the spring member. One end of each of the pair of flexures 420a and 420b may be attached to fixed mounting points 430a-430d. The pair of flexures 420a and 420b may be flexed in both the horizontal direction and the vertical direction, so as to translate the frame 410 horizontally and vertically, as indicated by the arrows in FIGS. 4A and 4B, respectively. In practice, to raster scan the electro-optic assembly of the lidar system horizontally and vertically, the frame 410 may be vibrated at or near its resonance frequencies in both horizontal and vertical directions.

Figure 5:
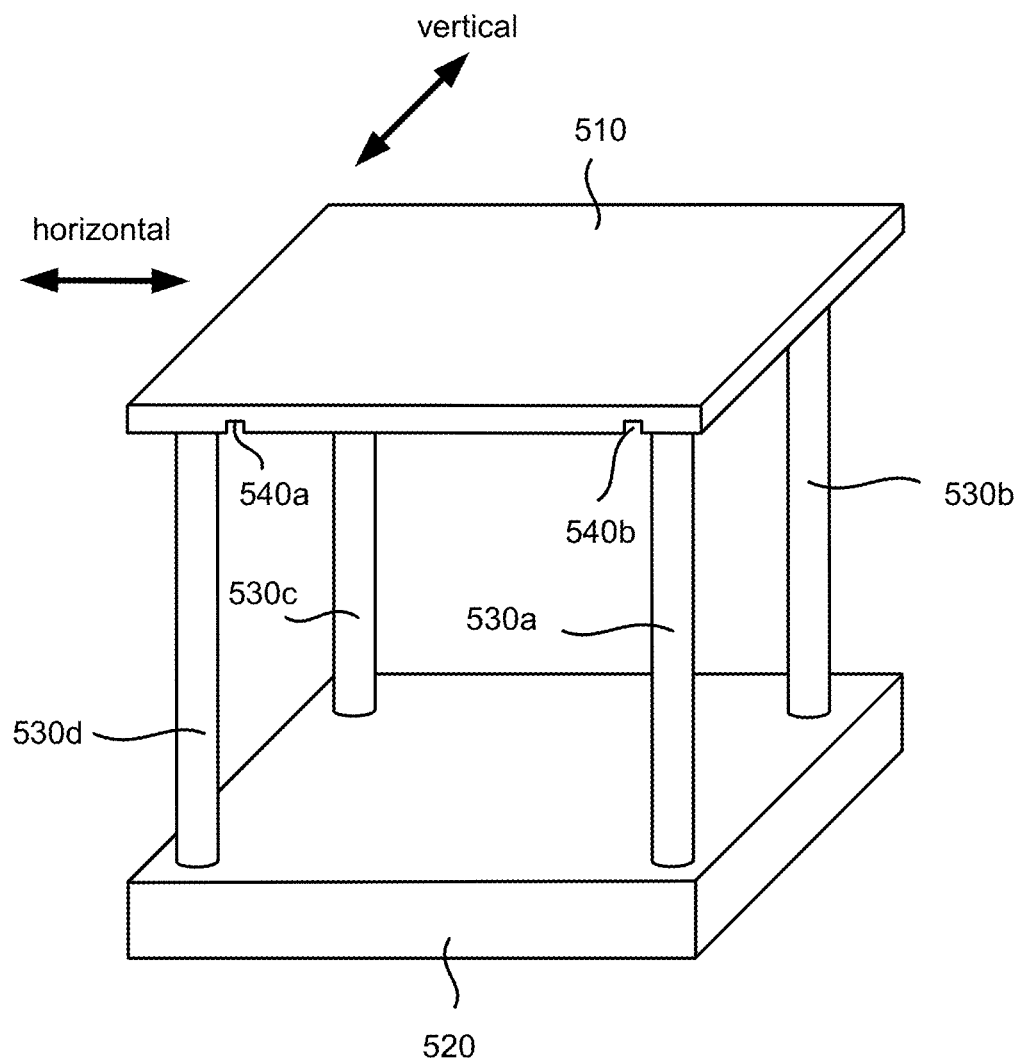
FIG. 5 illustrate schematically a flexure mechanism for scanning a lidar system according to some further embodiments of the present invention.

FIG. 5 illustrates schematically a resonator structure for scanning a lidar system according to some further embodiments of the present invention. A frame 510 may be attached to a fixed base 520 by a set of four rod springs 530a-530d. The frame 510 may carry an electro-optic assembly of the lidar system. For clarity, a counter-balance frame and a set of associated rod springs are not shown in FIG. 5.

The rod springs 530a-530d may be made of spring steel such as music wires. The rod springs 530a-530d may be made to have slightly different resonance frequencies in the horizontal and vertical directions. In some embodiments, this may be achieved by making the rod springs 530a-530d stiffer in the horizontal direction than in the vertical direction, or vice versa. In some other embodiments, this may be achieved by making the rod springs 530a-530d having a rectangular or an oval cross-section over a portion or an entire length thereof. Using springs with an oval cross-section may reduce stresses at the corners as compared to springs with a rectangular cross-section. Alternatively, each rod spring 530a-530d may have a rectangular cross-section with rounded corners to reduce stress. In some further embodiments, the frame 510 may include features such as the grooves 540A and 540B so that the mounting is stiffer in one direction than the other, thus inducing a difference in the resonance frequencies even if the rods are symmetrical in cross-section. Such mounting features may alternatively be incorporated into the fixed base 520 as well.

Many variations of implementing the resonator structures illustrated in FIG. 4A-4B or 5 in a lidar system are possible. For example, the lidar system may have two electro-optic assemblies, each having one or more laser sources and one or more photodetectors. The two electro-optic assemblies may be mounted on two separate frames. Resonator structures coupled to the two frames may be configured to move the two frames in opposite directions.

In some embodiments, voice coil motors (VCMs) may be arranged to drive a single frame, or both frames. Natural coupling between two resonators may ensure that, even if only one frame is driven, both may vibrate at approximately equal amplitudes. The voice coil motors may have a moving coil design or a moving magnet design. In some embodiments, the coil may be mounted on one frame and the magnet may be mounted on the other frame. The stiffness of a resonator for a counterweight or a VCM may be increased along with a corresponding reduction in amplitude, such that a momentum of one frame substantially cancels the momentum of the other frame.

According to various embodiments, separate VCMs may be used for motions along the two orthogonal axes, or a single VCM may be used that combines the drives for motions along both axes. In the latter case, a high Q resonance structure may be used to ensure that, although the single VCM is driven at both frequencies for the two axes, the frame primarily moves at its respective resonance frequency in each respective direction. Piezoelectric transducers or other linear actuators may also be used instead of a VCM as the driving mechanism.

Figure 6:
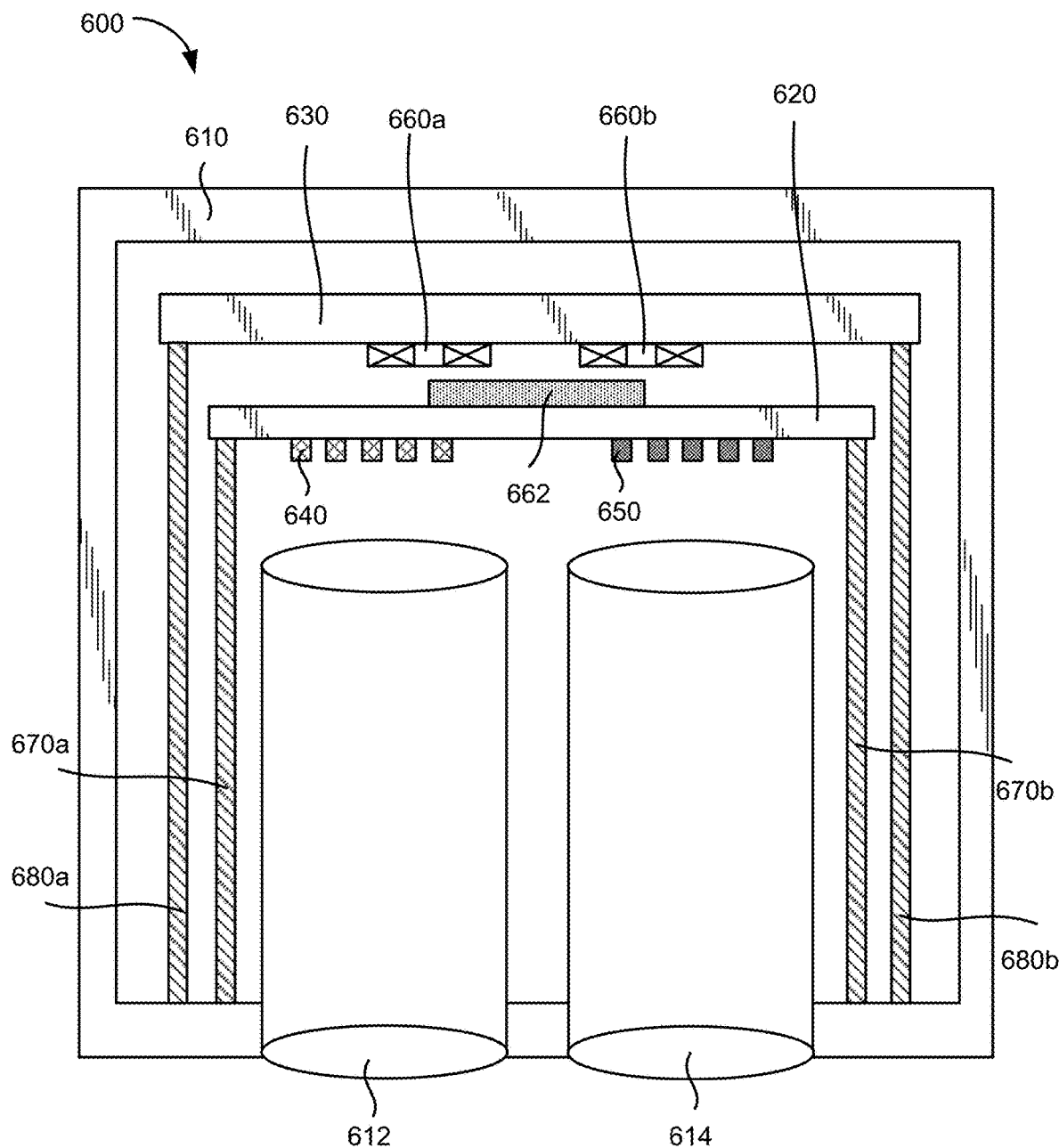
FIG. 6 illustrates schematically a two-dimensional scanning lidar system according to some embodiments of the present invention.

FIG. 6 illustrates schematically a two-dimensional scanning lidar system 600 with a Lissajous scan mechanism according to some embodiments of the present invention. The lidar system 600 may include a fixed frame 610, a first platform 620 movably attached to the fixed frame 610 via a first set of flexures 670a and 670b, and a second platform 630 movably attached to the fixed frame 610 via a second set of flexures 680a and 680b. An emission lens 612 and a receiving lens 614 are mounted on the fixed frame 610. The lidar system 600 includes an electro-optic assembly that may include one or more laser sources 640 and one or more photodetectors 650. The one or more laser sources 640 and the one or more photodetectors 650 are mounted on the first platform such that the emission surfaces of the one or more laser sources 640 lie substantially in a focal plane of the emission lens 612, and the detection surfaces of the one or more photodetectors 650 lie substantially in a focal plane of the receiving lens 614.

The first set of flexures 670a and 670b may be configured to move the first platform 630 left or right and in or out of the page relative to the fixed frame 610. A voice coil motor (VCM) that comprises a pair of coils 660a and 660b and a magnet 662 may be mounted between the first platform 620 and the second platform 630. In some embodiments, the magnet 662 may be mounted the first platform 620, and the pair of coils 660a and 660b may be mounted on the second platform 630, as illustrated in FIG. 6. The VCM may be configured to move the first platform 620 left or right, and move the second platform 630 in the opposite direction. The second platform 630 may serve as a counterweight to the first platform 620, so that the momentum of the second platform 630 may substantially cancel out the momentum of first platform 620. In some other embodiments, the positioning of the pair of coils 660a and 660b and the magnet 662 may be reversed; that is, the pair of coils 660a and 660b may be mounted on the first platform 620, and the magnet 662 may be mounted on the second platform 630. A second VCM (not shown) may be used to move the first platform 620 and the second platform 630 in or out of the page.

Figure 7:
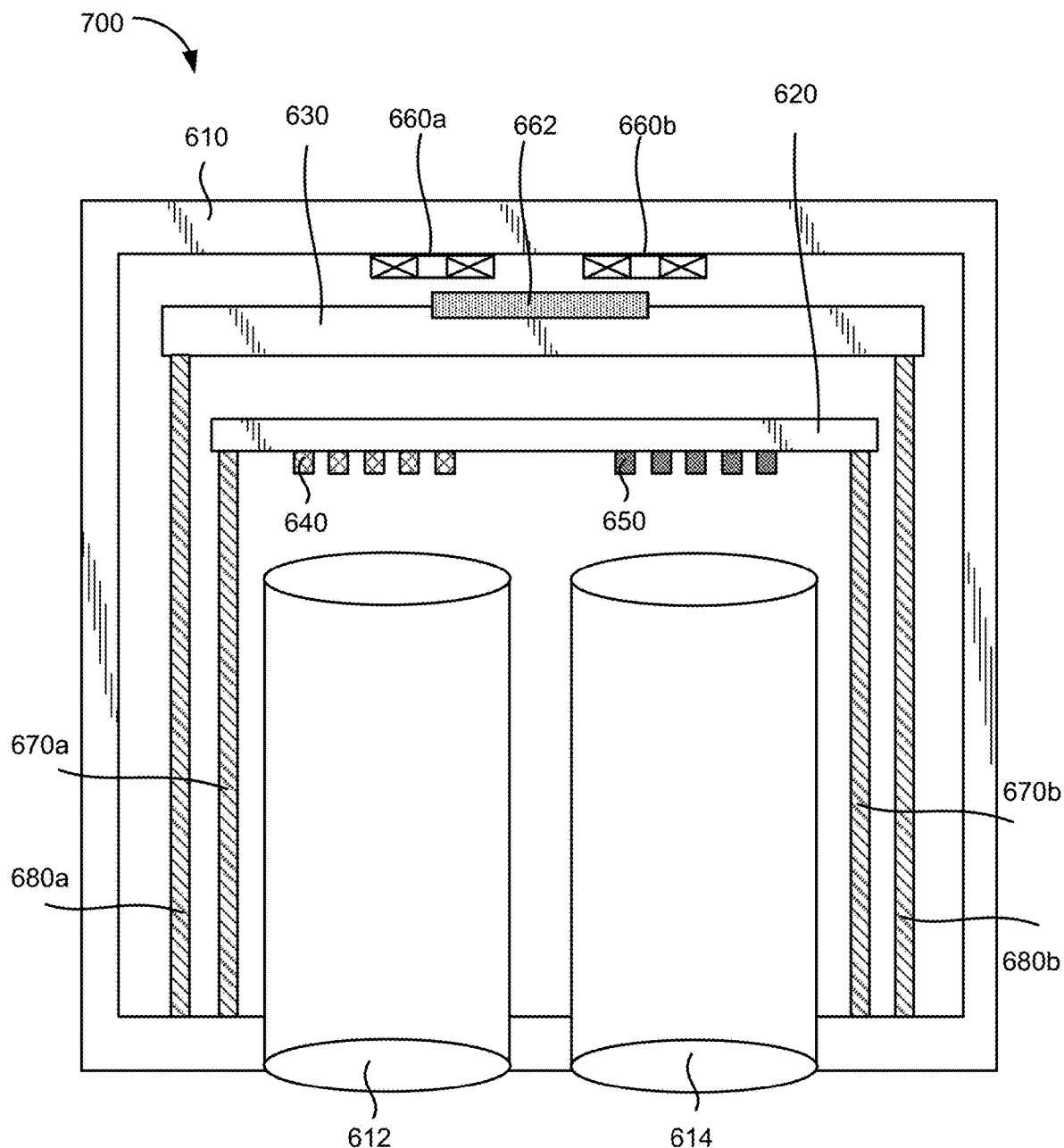
FIG. 7 illustrates schematically a two-dimensional scanning lidar system according to some other embodiments of the present invention.

FIG. 7 illustrates schematically a two-dimensional scanning lidar system 700 with a Lissajous scan mechanism according to some other embodiments of the present invention. The lidar system 700 is similar to the lidar system 600 illustrated in FIG. 6. But here, VCM is mounted between the fixed frame 610 and the second platform 630, where the pair of coils 660a and 660b is mounted on the fixed frame, and the magnet 662 is mounted on the second platform 630. The VCM is configured to move the second platform 630, which may carry a counterweight, left or right. The first platform 620 that carries the electro-optic assembly may vibrate sympathetically in the opposite direction of the second platform 630 if the resonant frequency of the first platform matches that of the second platform 630. A second set of coils and a second magnet (not shown) may be used to move the second platform 630 in or out of the page.

Figure 8:
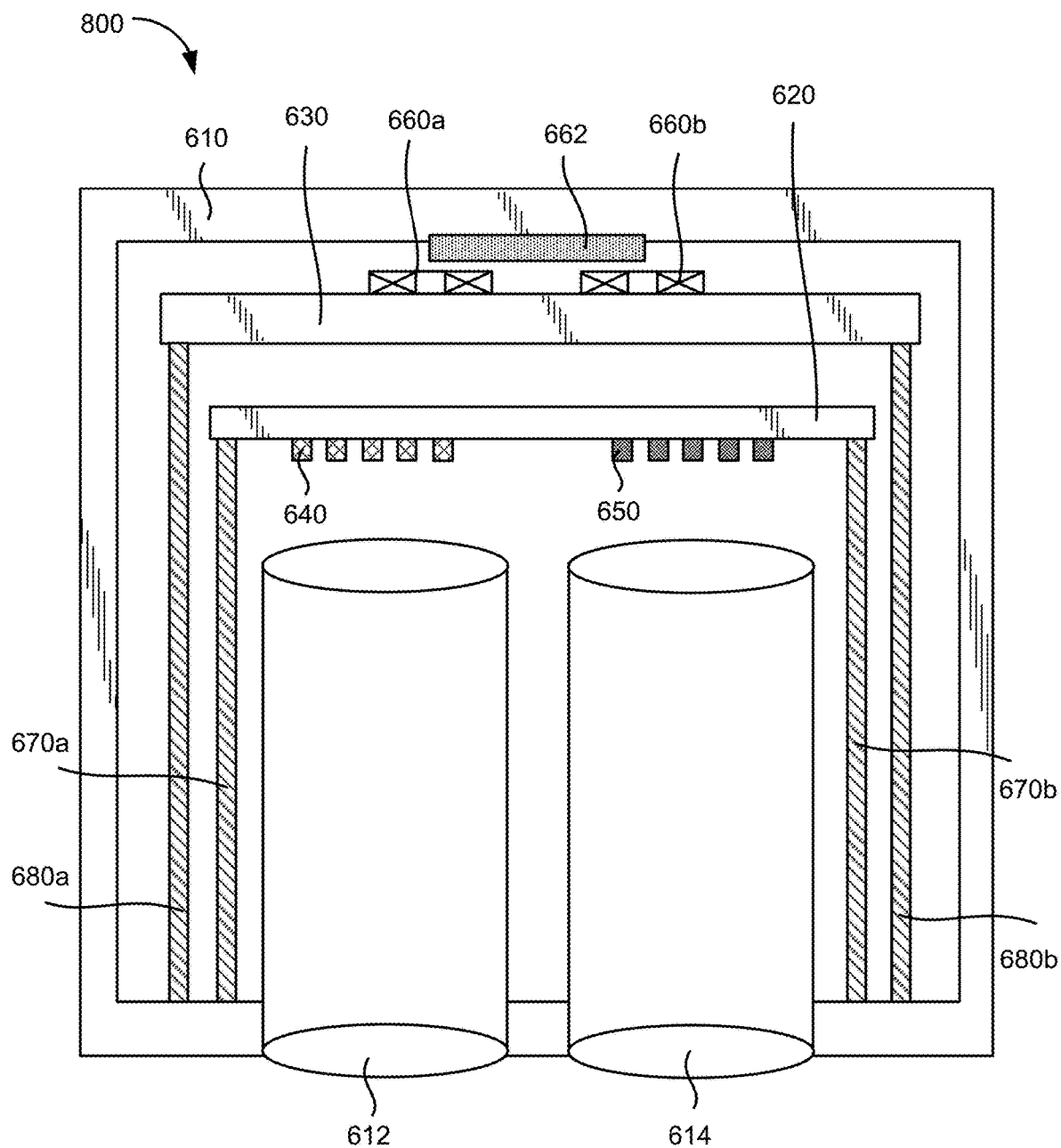
FIG. 8 illustrates schematically a two-dimensional scanning lidar system according to some further embodiments of the present invention.

FIG. 8 illustrates schematically a two-dimensional scanning lidar system 800 with a Lissajous scan mechanism according to some further embodiments of the present invention. The lidar system 800 is similar to the lidar system 700 illustrated in FIG. 7. But here, the positioning of the pair of coils 660a and 660b and the magnet 662 is reversed. That is, the pair of coils 660a and 660b is mounted on the second platform 630, and the magnet 662 is mounted on the fixed frame 610.

Figure 9:
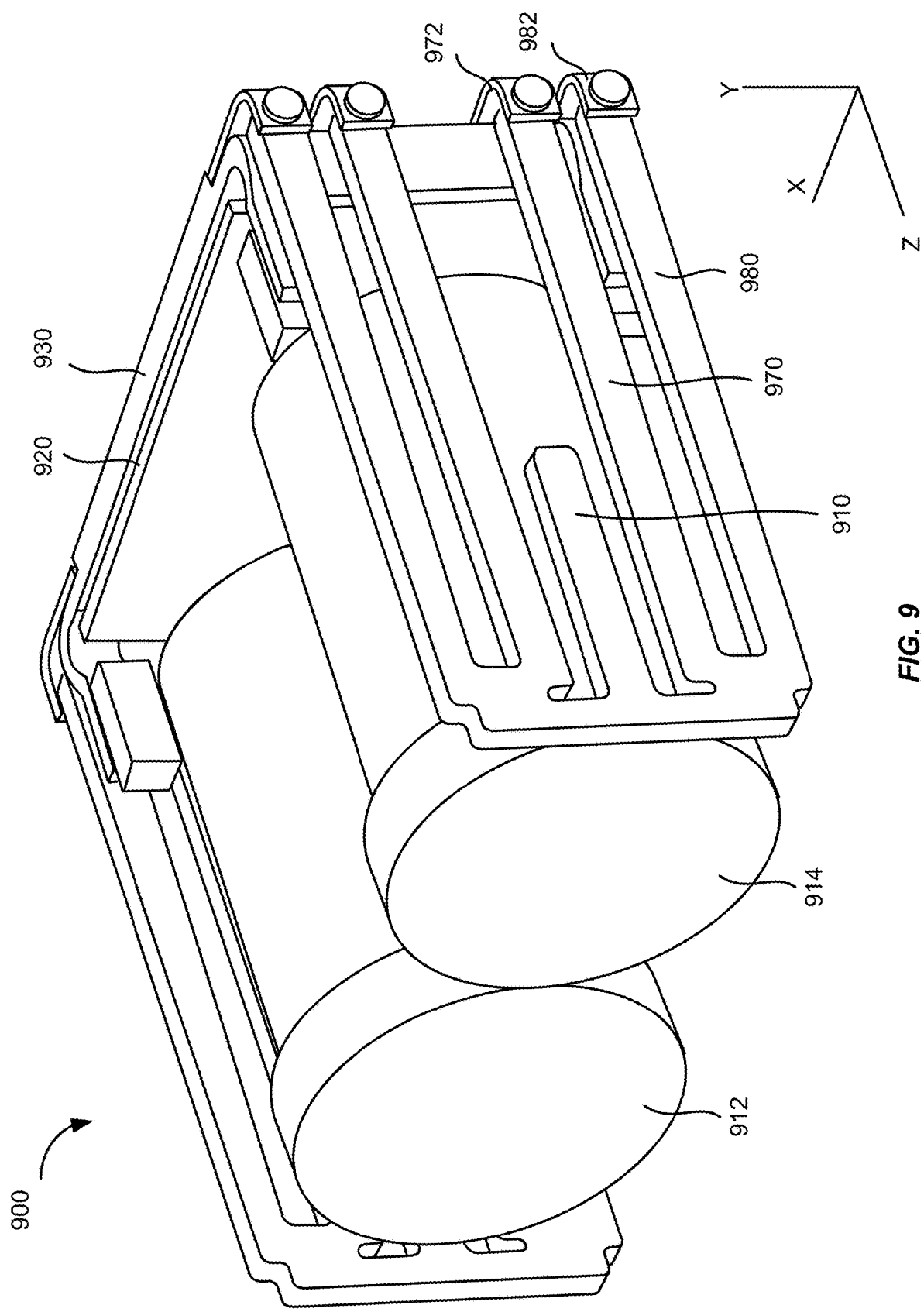
FIGS. 9 and 10 show a perspective view and a top view, respectively, of a two-dimensional scanning lidar system 900 according to some embodiments of the present invention.
Figure 10:
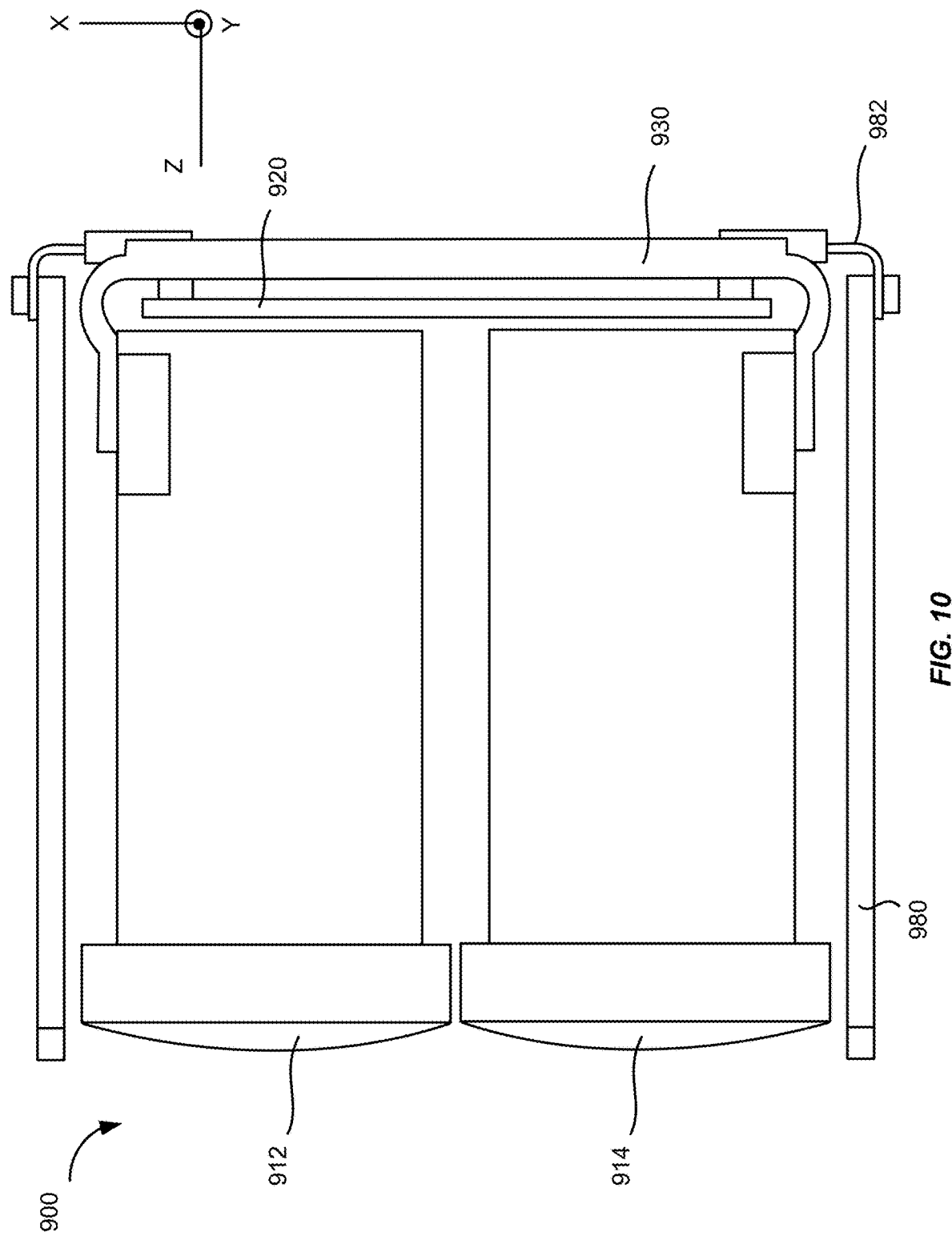

FIGS. 9 and 10 show a perspective view and a top view, respectively, of a two-dimensional scanning lidar system 900 according to some embodiments of the present invention. The lidar system 900 includes an emission lens 912 and a receiving lens 914 attached to a fixed base 910, a first frame 920 that may carry an electro-optic assembly of the lidar system 900, and a second frame 930 that may carry a counterweight. A first set of flexures 970 may flexibly couple the first frame 920 to the fixed base 910 via a first set of flexible hinges 972. A second set of flexures 980 may flexibly couple the second frame 930 to the fixed base 910 via a second set of flexible hinges 982. Each of the first set of flexible hinges 972 and the second set of flexible hinges 982 may be in the form of a ribbon so that it may be stiffer in the Y direction (e.g., vertical direction) than in the X direction (e.g., horizontal direction).

Figure 11:
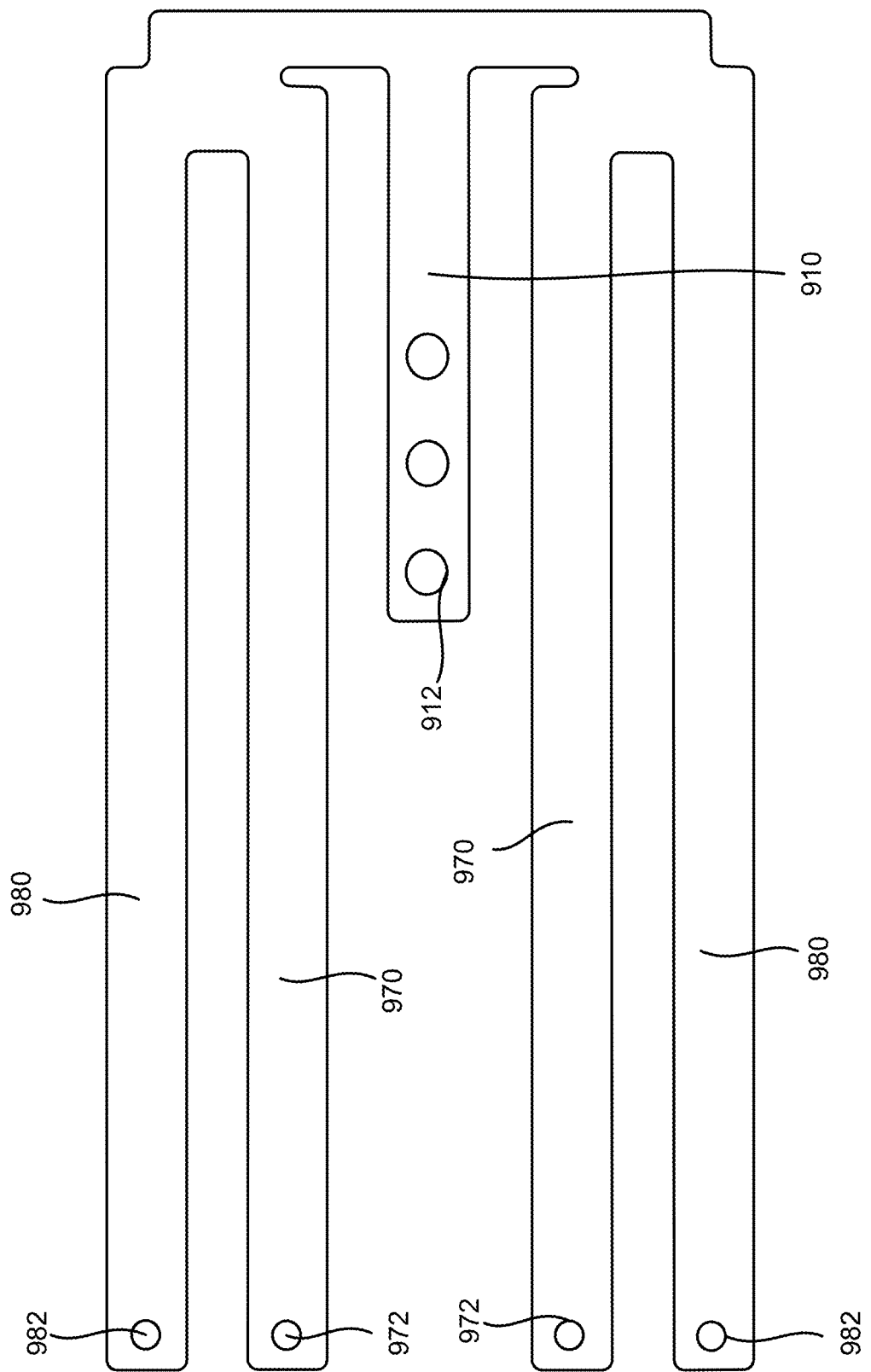
FIG. 11 shows a plan view of a flexure structure that may be used in the lidar system illustrated in FIGS. 9 and 10 according to some embodiments of the present invention.

FIG. 11 shows a plan view of a flexure structure that may be used in the lidar system 900 illustrated in FIGS. 9 and 10 according to some embodiments of the present invention. As illustrated, the flexure structure includes a fixed base 910. The fixed base 910 may include one or more mounting holes 912 for connecting to a fixed outer frame (not shown in FIGS. 9 and 10). The flexure structure may further include a set of first flexures 970. One end of each first flexure 970 may be connected to the fixed base 910, while the other end of each first flexure 970 may have a mounting hole 972 for connecting to the first frame 920 that carries the electro-optic assembly of the lidar system 900, as illustrated in FIGS. 9 and 10. The flexure structure further includes a set of second flexures 980. One end of each second flexure 980 may be connected to the fixed base 910, while the other end of each second flexure 980 may have a mounting hole 982 for connecting to the second frame 930 that carries a counterweight.

Figure 12:
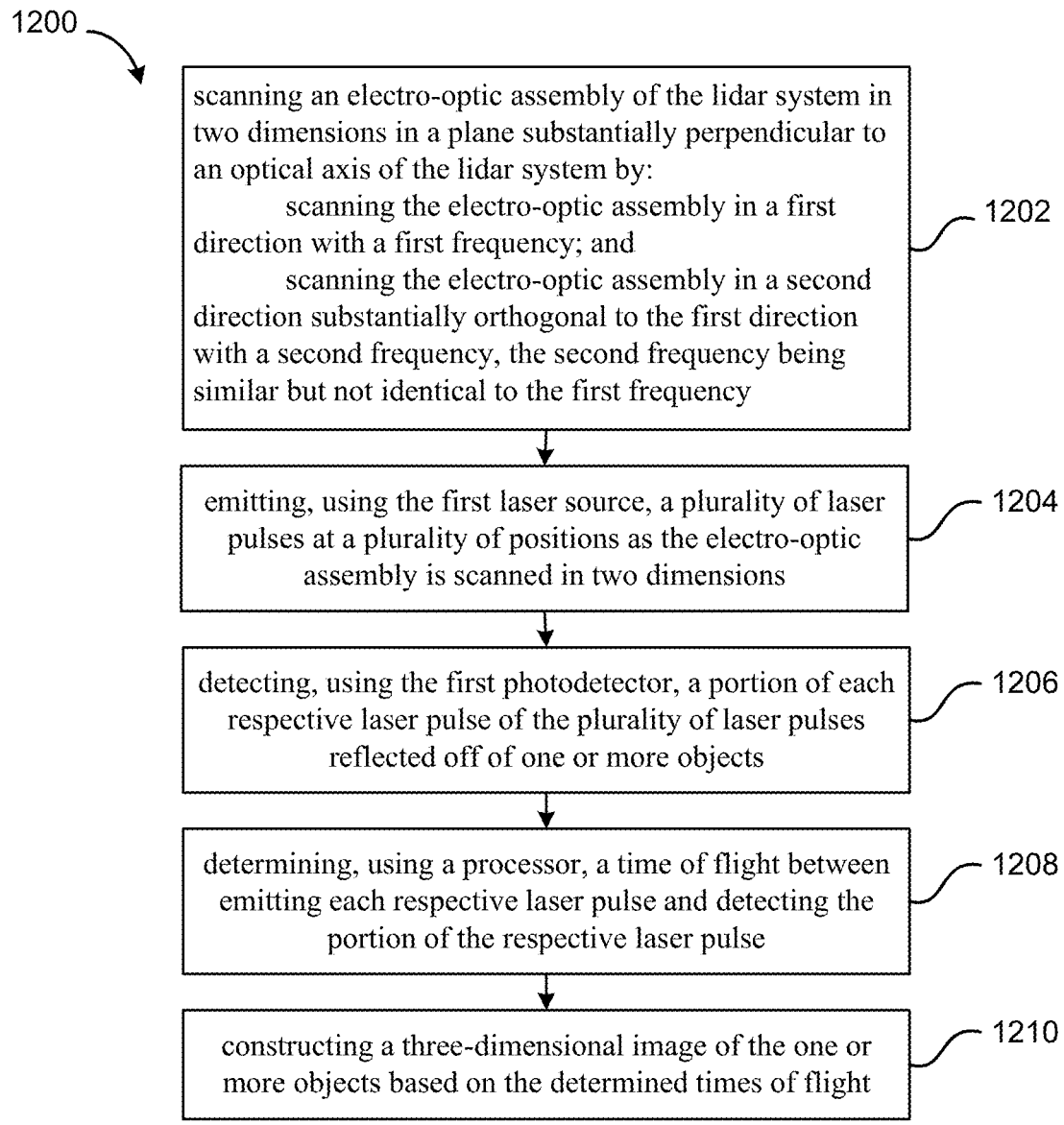
FIG. 12 shows a simplified flowchart illustrating a method 1200 of three-dimensional imaging using a scanning lidar system according to some embodiments of the present invention.

FIG. 12 shows a simplified flowchart illustrating a method 1200 of three-dimensional imaging using a scanning lidar system according to some embodiments of the present invention. The method 1200 may include, at 1202, scanning an electro-optic assembly of the lidar system in two dimensions in a plane substantially perpendicular to an optical axis of the lidar system. The electro-optic assembly may include a first laser and a first photodetector. The scanning the electro-optic assembly may include scanning the electro-optic assembly in a first direction with a first frequency, and scanning the electro-optic assembly in a second direction substantially orthogonal to the first direction with a second frequency. The second frequency is similar but not identical to the first frequency.

The method 1200 may further include, at 1204, emitting, using the first laser source, a plurality of laser pulses at a plurality of positions as the electro-optic assembly is scanned in two dimensions; and at 1206, detecting, using the first photodetector, a portion of each respective laser pulse of the plurality of laser pulses reflected off of one or more objects. The method 1200 may further include, at 1208, determining, using a processor, a time of flight between emitting each respective laser pulse and detecting the portion of the respective laser pulse; and at 1210, constructing a three-dimensional image of the one or more objects based on the determined times of flight.

It should be appreciated that the specific steps illustrated in FIG. 12 provide a particular method of three-dimensional imaging using a scanning lidar system according to some embodiments of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A scanning lidar system comprising:
   a fixed frame;
   a first platform;
   a first electro-optic assembly including a first laser source and a first photodetector mounted on the first platform;
   a first flexure assembly flexibly coupling the first platform to the fixed frame;
   a drive mechanism configured to, via the first flexure assembly, translate the first platform with respect to the fixed frame in two dimensions in a plane substantially perpendicular to an optical axis of the scanning lidar system; and a controller coupled to the drive mechanism, the controller configured to cause the drive mechanism to translate the first platform in a first direction with a first frequency and in a second direction with a second frequency, the second frequency being different from the first frequency.

2. The scanning lidar system of claim 1 wherein the second frequency differs from the first frequency such that a trajectory of the first electro-optic assembly follows a Lissajous figure.

3. The scanning lidar system of claim 1 wherein a ratio of the first frequency and the second frequency ranges from about 0.5 to about 2.0.

4. The scanning lidar system of claim 1 wherein the first flexure assembly comprises four springs, each of the four springs connecting a respective corner of the first platform to the fixed frame.

5. The scanning lidar system of claim 4 wherein each of the four springs comprises a flexible rod having a first resonance frequency in the first direction and a second resonance frequency in the second direction, and wherein the first frequency is substantially equal to the first resonance frequency, and the second frequency is substantially equal to the second resonance frequency.

6. The scanning lidar system of claim 1 wherein the first flexure assembly comprises a first spring and a second spring, the first spring connecting a first lateral side of the first platform to the fixed frame, and the second spring connecting a second lateral side opposite to the first lateral side to the fixed frame.

7. The scanning lidar system of claim 1 wherein the drive mechanism is mechanically coupled to the first platform for translating the first platform.

8. The scanning lidar system of claim 7 wherein the drive mechanism comprises a voice coil motor that is mounted on the first platform.

9. The scanning lidar system of claim 1 further comprising:
a second platform; and
a second flexure assembly flexibly coupling the second platform to the fixed frame;
wherein the drive mechanism is mechanically coupled to the second platform such that, as the first platform is translated, the second platform moves in a direction opposite to a direction of motion of the first platform.

10. The scanning lidar system of claim 9 further comprising:

a second electro-optic assembly including a second laser source and a second photodetector mounted on the second platform.

11. The scanning lidar system of claim 9 wherein:
the drive mechanism comprises a voice coil motor that is mounted on the second platform.

12. A resonator structure for operating a two-dimensional scanning lidar system, the resonator structure comprising:
a fixed frame;
a first platform for carrying a first electro-optic assembly of the scanning lidar system, the first electro-optic assembly including a first laser source and a first photodetector; and
a first set of springs flexibly coupling the first platform to the fixed frame, the first set of springs configured to be flexed in two orthogonal directions so as to translate the first platform in the two orthogonal directions in a plane substantially perpendicular to an optical axis of the scanning lidar system, wherein the first set of springs has a first resonance frequency in a first direction of the two orthogonal directions and a second resonance frequency in a second direction of the two orthogonal directions, the second resonance frequency being different from the first resonance frequency.

13. The resonator structure of claim 12 wherein the first set of springs comprises four rod springs, each of the four rod springs connecting a respective corner of the first platform to the fixed frame.

14. The resonator structure of claim 13 wherein each of the four rod springs comprises a rod having an oval cross-section, or a rectangular cross-section, or a rectangular cross-section with rounded corners.

15. The resonator structure of claim 13 wherein each of the four rod springs is connected to the first platform via a flexible member.

16. The resonator structure of claim 12 wherein each of the first set of springs comprises a leaf spring.

17. The resonator structure of claim 12 further comprising:
a second platform; and
a second set of springs flexibly coupling the second platform to the fixed frame, the second set of springs configured to be flexed in the two orthogonal directions so as to translate the second platform in the two orthogonal directions, wherein a direction of motion of the second platform opposes a direction of motion of the first platform.

18. The resonator structure of claim 17 wherein the second platform carries a counter weight such that a momentum of the second platform substantially cancels a momentum of the first platform.

* * * * *